United States Patent
Zhang et al.

(10) Patent No.: US 12,152,585 B1
(45) Date of Patent: Nov. 26, 2024

(54) SEALING SOFT WATER RECOVERY APPARATUS FOR VACUUM PUMP IN VACUUM PRESSURE SWING ADSORPTION OXYGEN GENERATION SYSTEM

(71) Applicant: SHANGHAI LIFENGAS CO., LTD, Shanghai (CN)

(72) Inventors: Zhengxiong Zhang, Shanghai (CN); Qinyou Tang, Shanghai (CN); Mingxing He, Shanghai (CN)

(73) Assignee: SHANGHAI LIFENGAS CO., LTD, Shanghai (CN)

( * ) Notice: Subject to any disclaimer, the term of this patent is extended or adjusted under 35 U.S.C. 154(b) by 0 days.

(21) Appl. No.: 18/764,360

(22) Filed: Jul. 4, 2024

Related U.S. Application Data (63) Continuation of application No. PCT/CN2024/092961, filed on May 14, 2024.

(30) Foreign Application Priority Data

May 25, 2023 (CN) .......................... 202310595312.0

(51) Int. Cl.
| | |
|---|---|
| *F04C 19/00* | (2006.01) |
| *B01D 19/00* | (2006.01) |
| *B01D 53/02* | (2006.01) |
| *B01D 53/047* | (2006.01) |
| *B01D 53/053* | (2006.01) |

(Continued)

(52) U.S. Cl.
CPC ........ *F04C 19/004* (2013.01); *B01D 19/0052* (2013.01); *B01D 53/02* (2013.01); *B01D 53/053* (2013.01); *F04C 19/005* (2013.01); *F04C 29/0092* (2013.01); *F04C 29/02* (2013.01); *F04D 7/045* (2013.01); *F04D 9/041* (2013.01); *F04D 19/046* (2013.01); *F04D 29/2288* (2013.01); *B01D 53/0476* (2013.01); *B01D 2256/12* (2013.01); *B01D 2257/80* (2013.01); *B01D 2259/40007* (2013.01)

(58) Field of Classification Search
CPC .. F04C 19/004; F04C 19/005; F04C 29/0092; F04C 29/02; B01D 19/0052; B01D 53/02; B01D 53/053; B01D 53/0476; B01D 2256/12; B01D 2257/80; B01D 2259/40007; F04D 7/045; F04D 9/041; F04D 19/046; F04D 29/2288
See application file for complete search history.

(56) References Cited

U.S. PATENT DOCUMENTS

| | | | | |
|---|---|---|---|---|
| 3,642,384 A | * | 2/1972 | Huse ................ | F04C 19/00 417/69 |
| 3,922,110 A | * | 11/1975 | Huse ................ | F04B 9/02 60/431 |

FOREIGN PATENT DOCUMENTS

| | | |
|---|---|---|
| CN | 211328827 U | 8/2020 |
| CN | 217939675 U | 12/2022 |

* cited by examiner

*Primary Examiner* — Peter J Bertheaud (57) ABSTRACT

The present application relates to a sealing soft water recovery apparatus for a vacuum pump in a vacuum pressure swing adsorption oxygen generation system, including a water tank, a wet Roots vacuum pump, a steam-water separator, and a collecting sink which are sequentially connected, where the collecting sink is connected to the water tank by a delivery tube provided with a delivery pump; and the water tank is connected to the wet Roots vacuum pump by a water inlet tube provided with a solenoid valve for controlling the opening and closing of a water channel. The present application has the effects of recovering sealing soft water and saving resources.

5 Claims, 10 Drawing Sheets

(51) Int. Cl.
*F04C 29/00* (2006.01)
*F04C 29/02* (2006.01)
*F04D 7/04* (2006.01)
*F04D 9/04* (2006.01)
*F04D 19/04* (2006.01)
*F04D 29/22* (2006.01)

SEALING SOFT WATER RECOVERY APPARATUS FOR VACUUM PUMP IN VACUUM PRESSURE SWING ADSORPTION OXYGEN GENERATION SYSTEM

CROSS REFERENCE OF RELATED APPLICATION

This application is a Continuation Application of the International Application PCT/CN2024/092961, filed on May 14, 2024, which claims priority to Chinese Patent Application No. CN 202310595312.0, filed on May 25, 2023, the contents of which are incorporated herein by reference in its entirety

FIELD OF TECHNOLOGY

The present application relates to the field of vacuum pressure swing adsorption oxygen generation systems, in particular to a sealing soft water recovery apparatus for a vacuum pump in a vacuum pressure swing adsorption oxygen generation system.

BACKGROUND

In a vacuum pressure swing adsorption oxygen generation system, an air blower is used to boost raw air and deliver it into an adsorption tower, water, carbon dioxide, and nitrogen in the raw air are selectively adsorbed under high pressure by using different adsorbents filled in the adsorption tower, and unadsorbed oxygen becomes a product gas produced by the system; when adsorption of the adsorbents is saturated, a vacuum pump is used to vacuumize the adsorption tower for pressure reduction, such that the water, carbon dioxide and nitrogen adsorbed by the adsorbents are desorbed, and the adsorbents are regenerated; and oxygen-rich products with high oxygen concentration are obtained by means of multi-tower circulation.

A vacuum pressure swing adsorption oxygen generation device usually includes an air blower unit, a wet vacuum pump unit, an oxygen-nitrogen separation system, and an oxygen balance system.

Due to the particularity of the pressure swing adsorption oxygen generation process, a high vacuum degree is required during operation to perform desorption from adsorbents with saturated adsorption. An ordinary dry vacuum pump cannot achieve the required vacuum degree, and sealing water needs to be added to seal gaps between impellers as well as between an impeller and a cavity wall during air pumping by the vacuum pump so as to achieve the goal of complete desorption from the adsorbents.

However, the sealing water is often soft water with high price and high consumption. If the sealing soft water used in the vacuum pump is directly discharged, a great waste will be resulted. Therefore, a recovery control system for sealing soft water is urgently needed.

SUMMARY

In order to reduce the waste of sealing soft water, the present application provides a sealing soft water recovery apparatus for a vacuum pump in a vacuum pressure swing adsorption oxygen generation system.

A sealing soft water recovery apparatus for a vacuum pump in a vacuum pressure swing adsorption oxygen generation system provided by the present application adopts the following technical solution:

A sealing soft water recovery apparatus for a vacuum pump in a vacuum pressure swing adsorption oxygen generation system includes a water tank, a wet Roots vacuum pump, a steam-water separator, and a collecting sink which are sequentially connected, where the collecting sink is connected to the water tank by a delivery tube provided with a delivery pump; and the water tank is connected to the wet Roots vacuum pump by a water inlet tube provided with a solenoid valve for controlling the opening and closing of a water channel.

With the adoption of the above technical solution, the water tank is configured to store sealing soft water, the sealing soft water is delivered to the wet Roots vacuum pump by the water inlet tube to achieve a sealing effect, the sealing soft water is mixed with a gas to form a water-containing gas, the water-containing gas enters the steam-water separator, the steam-water separator separates the sealing soft water from the gas, the separated sealing soft water enters the collecting sink to be collected, and after a certain volume of the collecting sink is reached, the soft water in the collecting sink is delivered into the water tank by using the delivery pump for reuse, thus implementing recycling of the soft water.

Optionally, the water inlet tube is provided with a first manual switching valve located at an inlet end of the solenoid valve and a second manual switching valve located at an outlet end of the solenoid valve; and the water inlet tube is further provided with a bypass hose in parallel, and the bypass hose is provided with a third manual switching valve.

With the adoption of the above technical solution, when the sealing soft water is normally delivered, both the first manual switching valve and the second manual switching valve are opened, the third manual switching valve is closed, and the connection and disconnection of the entire water inlet tube are controlled by the solenoid valve.

When the solenoid valve malfunctions, both the first manual switching valve and the second manual switching valve can be closed, and the connection and disconnection of the entire water inlet tube are controlled by the third manual switching valve as an emergency measure, so as to ensure normal operation of the vacuum pump.

Optionally, the water inlet tube is provided with a flow meter and a flow control hand valve both located between the water tank and the solenoid valve.

With the adoption of the above technical solution, it is convenient to accurately control a flow rate of the sealing soft water, so as to reduce the waste.

Optionally, a liquid level switch is arranged in the collecting sink and electrically connected to the delivery pump.

With the adoption of the above technical solution, the liquid level switch can obtain a liquid level of the collecting sink to control the start and stop of the delivery pump in a timely manner, such that the soft water can be replenished into the water tank in a timely manner.

Optionally, the steam-water separator includes a conical barrel, a central tube, a fan, and a driving assembly, where an air inlet tube communicating with an outlet of the wet Roots vacuum pump is arranged at an upper part of the barrel, and a lower end opening of the barrel is connected to the collecting sink; the central tube is coaxial with the barrel, an upper end of the central tube extends out of the barrel and is connected to an air inlet end of the fan, an outer peripheral wall of the central tube is fixedly sleeved with a first spiral blade, rubber shoveling edges are provided on an outer edge of the first spiral blade and attached to an inner peripheral wall of the barrel, and a surface of the first spiral blade, the inner peripheral wall of the barrel, and an outer peripheral surface of the central tube define a spiral channel; the driving assembly is configured to drive the central tube to rotate about an axis of the barrel, and when the central tube drives the first spiral blade to rotate, a lower surface of the first spiral blade applies a downward pressure to a water-containing airflow.

With the adoption of the above technical solution, when the fan generates a suction force, the water-containing airflow entering from the water inlet tube moves in a spirally downward state along the spiral channel. During the process, under the action of a centrifugal force, water droplets are thrown towards an inner wall of the barrel and flow into the lower end opening of the barrel along the spiral channel, while the water-containing airflow located at a lower part of the barrel moves up along the central tube to the fan and is discharged from the fan to a position where a next treatment process is performed, thus implementing steam-water separation.

First, the spiral channel is provided to limit a motion path of the water-containing airflow, such that the motion path is extended to increase the time and probability of throwing out the water droplets, thereby improving the effect of steam-water separation.

Secondly, through the rotation of the central tube and the first spiral blade, the lower surface of the first spiral blade applies the downward pressure to the water-containing airflow, that is, kinetic energy of the water-containing airflow is increased, such that the efficiency of steam-water separation is improved; moreover, the centrifugal force is increased to increase the quantity of the water droplets thrown out, thereby improving the effect of steam-water separation.

Thirdly, the rubber shoveling edges are provided and attached to the inner wall of the barrel. The rubber shoveling edges, when moving relative to the barrel, scrape away the attached soft water on the inner wall of the barrel, and the rubber shoveling edges are spiral. As a result, the rubber shoveling edges, when moving, scrape away the soft water downwards, thus making it convenient for the soft water to be discharged downwards.

Optionally, the lower surface of the first spiral blade is set as a concave-convex surface provided with a plurality of arc-shaped flow guide grooves uniformly arranged around an axis of the first spiral blade, and one end of each of the flow guide grooves communicates to an outer peripheral surface of the first spiral blade.

With the adoption of the above technical solution, first, the concave-convex surface can use a tension of water to efficiently adsorb the soft water, such that the first spiral blade can also capture a certain amount of the soft water during movement, thereby improving the effect of steam-water separation; secondly, the soft water attached to the concave-convex surface can withstand evaporation due to its tension and is not easily carried away by the airflow; and thirdly, under a rotational force of the first spiral blade, the soft water on the concave-convex surface is subjected to the centrifugal force and slowly moves outward, and the soft water easily falls into the arc-shaped flow guide grooves and then is quickly discharged along the flow guide grooves to the inner wall of the barrel to facilitate downstream collection of the soft water, thereby reducing the situation that the soft water on the concave-convex surface is not liable to flow.

Optionally, the central tube sequentially includes an equal-width section, an upper conical section, and a lower conical section from top to bottom, where a length of the lower conical section is greater than a length of the upper conical section, a large end opening of the lower conical section is connected to a large end opening of the upper conical section, a lower end opening of the equal-width section is connected to a small end opening of the upper conical section, and an upper end opening of the equal-width section is rotatably connected to the air inlet end of the fan.

With the adoption of the above technical solution, first, the provision of the lower conical section can accelerate the diffusion of the water-containing airflow just entering the central tube, so as to improve the separation efficiency of the water-containing airflow; and secondly, the upper conical section is provided to preliminarily block the water-containing airflow that moves up, so as to intercept part of the soft water.

Optionally, a plurality of vertically spaced suction paddles are fixed in the lower conical section, and when the central tube rotates, an action force of the suction paddles drives the water-containing airflow to ascend; and a second spiral blade is coaxially arranged in the upper conical section, an outer edge of the second spiral blade is fixedly connected to an inner peripheral wall of the upper conical section, and flow guide paddles located at an axis of the upper conical section are fixed on an inner peripheral wall of the second spiral blade.

With the adoption of the above technical solution, firstly, the diffusion acceleration of the lower conical section and the suction effect of the suction paddles can greatly accelerate the diffusion of the water-containing airflow just entering the central tube, so as to improve the separation efficiency of the water-containing airflow; and secondly, through the arrangement of the second spiral blade and the flow guide paddle, the water-containing airflow that moves up is dramatically blocked, and the soft water is attached to the flow guide paddles and the second spiral blade and then is thrown out by the centrifugal force, so as to facilitate secondary separation of the water-containing airflow.

Optionally, the upper end of the central tube is connected to the air inlet end of the fan by a corrugated tube, a through hole for the central tube to pass through is provided on an upper end surface of the barrel, the central tube is fixedly sleeved with a rubber ring, a ring groove is provided on an outer peripheral wall of the rubber ring, a slip ring vertically slides in the ring groove, a bearing is arranged between the slip ring and an inner wall of the through hole, and when the central tube moves up, there are water passing gaps between the rubber shoveling edges and the inner peripheral wall of the barrel; and a flow channel extending along a main line of the barrel is provided inside the barrel, annular water passing gaps are provided on the inner peripheral wall of the barrel and communicate with the flow channel, the flow channel communicates with the lower end opening of the barrel, and the water passing gaps are inclined downwards.

With the adoption of the above technical solution, under the action of gravity, the central tube is in a low position, and the rubber shoveling edges on the first spiral blade are in a state where they are attached to the inner peripheral wall of the barrel. At this time, with the rotation of the first spiral blade, the water-containing airflow can be pressurized and accelerated, so as to facilitate steam-water separation of the water-containing airflow.

When the soft water on the inner wall of the barrel needs to be quickly discharged, the driving assembly can be used to increase a rotational speed of the first spiral blade. At this time, a reaction force of the water-containing airflow on the first spiral blade increases. This reaction force is applied to the lower surface of the first spiral blade to support the first spiral blade, causing the first spiral blade to move up a short distance. At this time, there are the water passing gaps between the rubber shoveling edges and the inner peripheral wall of the barrel, and a pressure difference is caused, that is, a pressure below the water passing gaps is greater than a pressure above the water passing gaps. Under the pressure difference, the soft water attached to the barrel and located near the water passing gaps moves up a short distance. The soft water enters the flow channel through the water passing gaps and then flows down to be discharged under the action of gravity, such that the soft water on the inner wall of the barrel is quickly discharged and is not easily carried away again by the airflow.

Optionally, shielding rings coaxial with the barrel are fixed on an outer side of the first spiral blade; and when the central tube moves down, the shielding rings move down to shield the water passing gaps, and when the central tube moves up, the shielding rings move up to move away from the water passing gaps.

With the adoption of the above technical solution, through the arrangement of the shielding rings, closure of the water passing gaps in a normal state can be displayed, such that the spiral channel is closed as much as possible to reduce the leakage of the water-containing airflow, thereby ensuring the effect of pressurization.

In summary, the present application has at least one of the following beneficial technical effects:
1. The separation is performed by the steam-water separator, the soft water is collected by the collecting sink, and the collected soft water is delivered into the water tank by the delivery pump for reuse, thereby implementing recycling of the soft water; and the solenoid valve is set to be in signal connection with the wet Roots vacuum pump, such that the wet Roots vacuum pump has a certain period of time to idle before stop, so as to ensure dry inside of a rotor of the wet Roots vacuum pump and get ready for next startup.
2. The spiral channel is provided to limit the motion path of the water-containing airflow, such that the motion path is extended to increase the time and probability of throwing out the water droplets, thereby improving the effect of steam-water separation. Through the rotation of the central tube and the first spiral blade, the lower surface of the first spiral blade applies the downward pressure to the water-containing airflow to increase the kinetic energy of the water-containing airflow, such that the efficiency and effect of steam-water separation are improved.
3. By changing the rotational speed of the first spiral blade, not only can the pressurization and acceleration effects of the first spiral blade on the water-containing airflow be achieved, but the height position of the first spiral blade can be changed to form the water passing gaps and the pressure difference, such that the soft water attached to the barrel and located near the water passing gaps moves up a short distance, and the soft water enters the flow channel through the water passing gaps and then is discharged under the action of gravity, thus implementing quick discharge of the soft water on the inner wall of the barrel.

DESCRIPTION OF THE EMBODIMENTS

The present application is further described in detail below with reference to the drawings 1 to 10.

Embodiment 1

Figure 1:
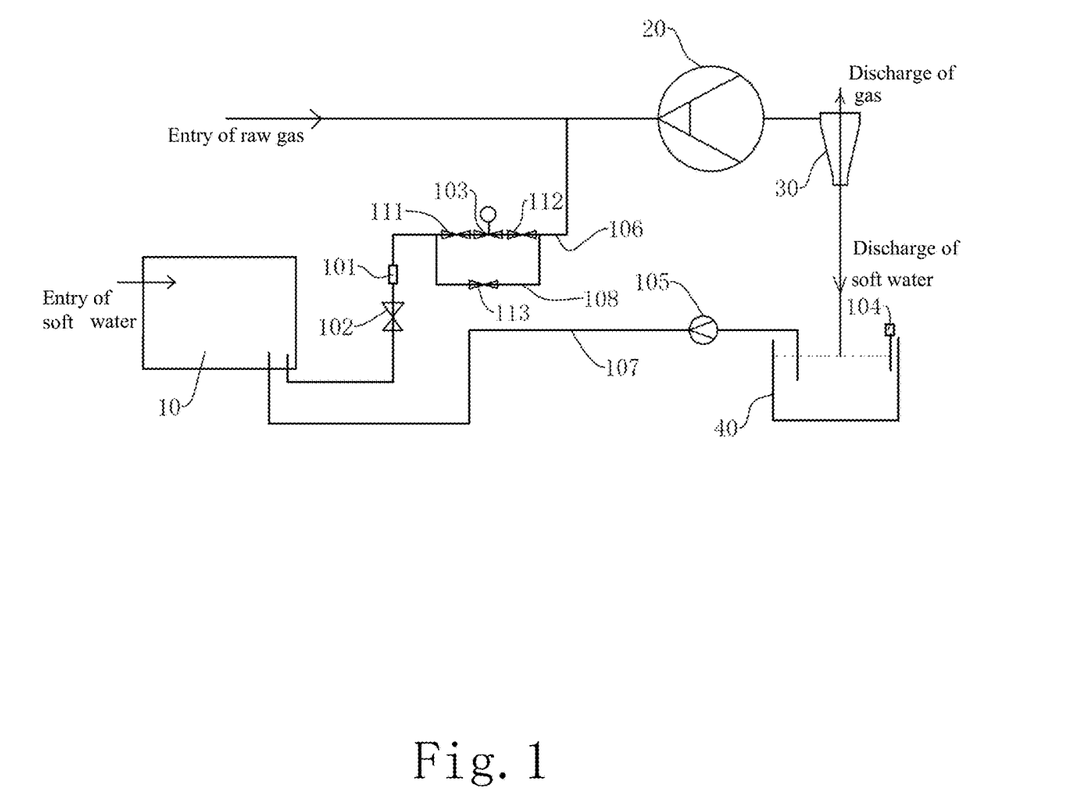
FIG. 1 is a schematic flowchart of a recovery apparatus according to Embodiment 1.

Referring to FIG. 1, Embodiment 1 discloses a sealing soft water recovery apparatus for a vacuum pump in a vacuum pressure swing adsorption oxygen generation system, including a water tank 10, a wet Roots vacuum pump 20, a steam-water separator 30, and a collecting sink 40. Soft water enters from an inlet end of the water tank 10. The water tank 10 is configured to store sealing soft water. The water tank 10 is connected to the wet Roots vacuum pump 20 by a water inlet tube 106. The collecting sink 40 is connected to the water tank 10 by a delivery tube 107.

A water tube is provided with a flow meter 101 and a flow control hand valve 102, such that it is convenient to accurately control a flow rate of the sealing soft water entering the wet Roots vacuum pump 20, thereby reducing waste.

The water inlet tube 106 is provided with a solenoid valve 103 for controlling the opening and closing of a water channel. Moreover, the water inlet tube 106 is further provided with a first manual switching valve 111 located at an inlet end of the solenoid valve 103 and a second manual switching valve 112 located at an outlet end of the solenoid valve 103.

The water inlet tube 106 is further provided with a bypass hose 108 in parallel, and the bypass hose 108 is provided with a third manual switching valve 113.

A liquid level switch 104 is arranged in the collecting sink 40, the delivery tube 107 is provided with a delivery pump 105, and the liquid level switch 104 is electrically connected to the delivery pump 105.

When in use, both the first manual switching valve 111 and the second manual switching valve 112 are opened, the third manual switching valve 113 is closed, the connection and disconnection of the entire water inlet tube 106 are controlled by the solenoid valve 103, the solenoid valve 103 is opened, and the sealing soft water in the water tank 10 is delivered to the wet Roots vacuum pump 20 by the water inlet tube 106, so as to achieve a sealing effect.

The sealing soft water is mixed with a gas to form a water-containing gas, the water-containing gas enters the steam-water separator 30 which may be a baffle type steam-water separator or a cyclone type steam-water separator, the steam-water separator 30 separates the sealing soft water from the gas, the separated gas is discharged to a position where a next treatment process is performed, the separated sealing soft water enters the collecting sink 40 to be collected, and after a certain volume of the collecting sink 40 is reached, the liquid level switch 104 obtains a liquid level of the collecting sink 40 to control the start and stop of the delivery pump 105, such that the soft water can be replenished into the water tank 10 for reuse, thus implementing recycling of the soft water, reducing resource waste.

Moreover, in order to prolong the practical life of the wet Roots vacuum pump 20, when the wet Roots vacuum pump 20 receives a stop signal, the stop signal can be synchronously sent to the solenoid valve 103, the solenoid valve 103 is immediately closed, and the water inlet tube 106 is disconnected. At this time, the wet Roots vacuum pump 20 idles for a preset time, which may be 3-5 min, before stop, so as to ensure dry inside of a rotor of the wet Roots vacuum pump 20 and get ready for next startup.

When the solenoid valve 103 malfunctions, both the first manual switching valve 111 and the second manual switching valve 112 can be closed, and the connection and disconnection of the entire water inlet tube 106 are controlled by the third manual switching valve 113 as an emergency measure, so as to ensure normal operation of the vacuum pump.

Embodiment 2

Figure 2:
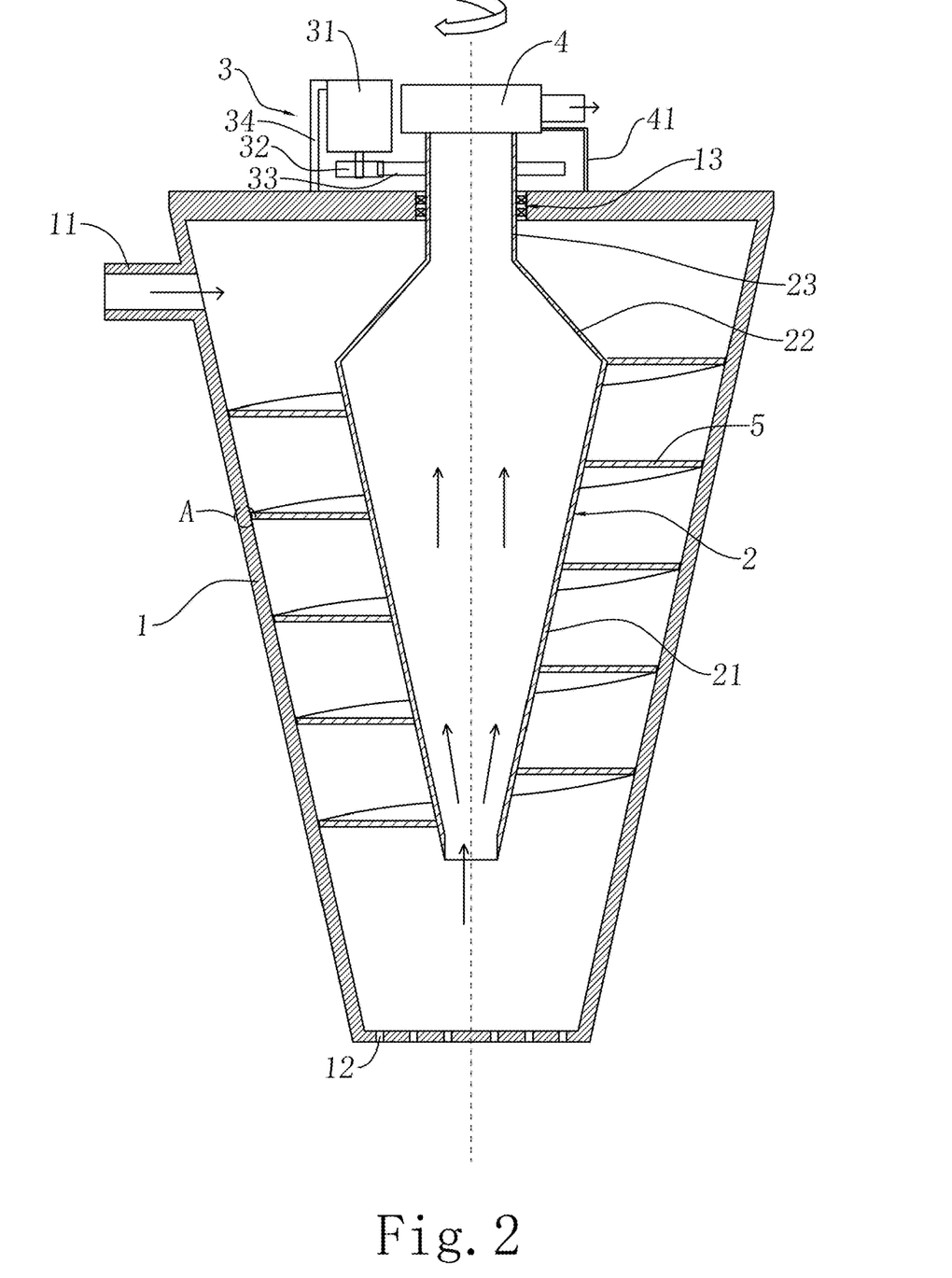
FIG. 2 is a sectional view of a steam-water separator according to Embodiment 2.

The difference between Embodiment 2 and Embodiment 1 is that as shown in FIG. 2, the steam-water separator 30 includes a conical barrel 1, a central tube 2, a fan 4, and a driving assembly 3, where a large end of the barrel 1 is located at an upper part of the barrel 1, an air inlet tube 11 is arranged at the upper part of the barrel 1 and communicates with an outlet of the wet Roots vacuum pump 20, and a lower end opening of the barrel 1 is provided with a plurality of water-permeable holes 12 and connected to the collecting sink 40.

The central tube 2 is coaxial with the barrel 1. The central tube 2 sequentially includes an equal-width section 23, an upper conical section 22, and a lower conical section 21 from top to bottom, where a length of the lower conical section 21 is greater than a length of the upper conical section 22, a large end opening of the lower conical section 21 is connected to a large end opening of the upper conical section, and a lower end opening of the equal-width section 23 is connected to a small end opening of the upper conical section 22.

A through hole 13 is provided on an upper end surface of the barrel 1 in a penetration manner, the equal-width section 23 passes through the through hole 13 upwards, and an outer peripheral wall of the equal-width section 23 is rotatably connected to an inner wall of the through hole 13 by a bearing 14. In order to reduce the leakage of the water-containing airflow, a sealing ring can be added at the through hole 13 to improve the sealing performance.

The fan 4 is fixed above the barrel 1 by a first bracket 41, and an upper end opening of the equal-width section 23 is rotatably and hermetically connected to an air inlet end of the fan 4. The driving assembly 3 includes a motor 31, a first gear 32, and a second gear 33, where the motor 31 is fixed above the barrel 1 by a second bracket 34, the first gear 32 is fixed to an output shaft of the motor 31, the second gear 33 is fixed to an upper part of the equal-width section 23 in a sleeving manner, and the first gear 32 is meshed with the second gear 33. The motor 31 rotates to drive the central tube 2 to coaxially rotate relative to the barrel 1 (see FIG. 2 for a rotation direction).

Figure 3:
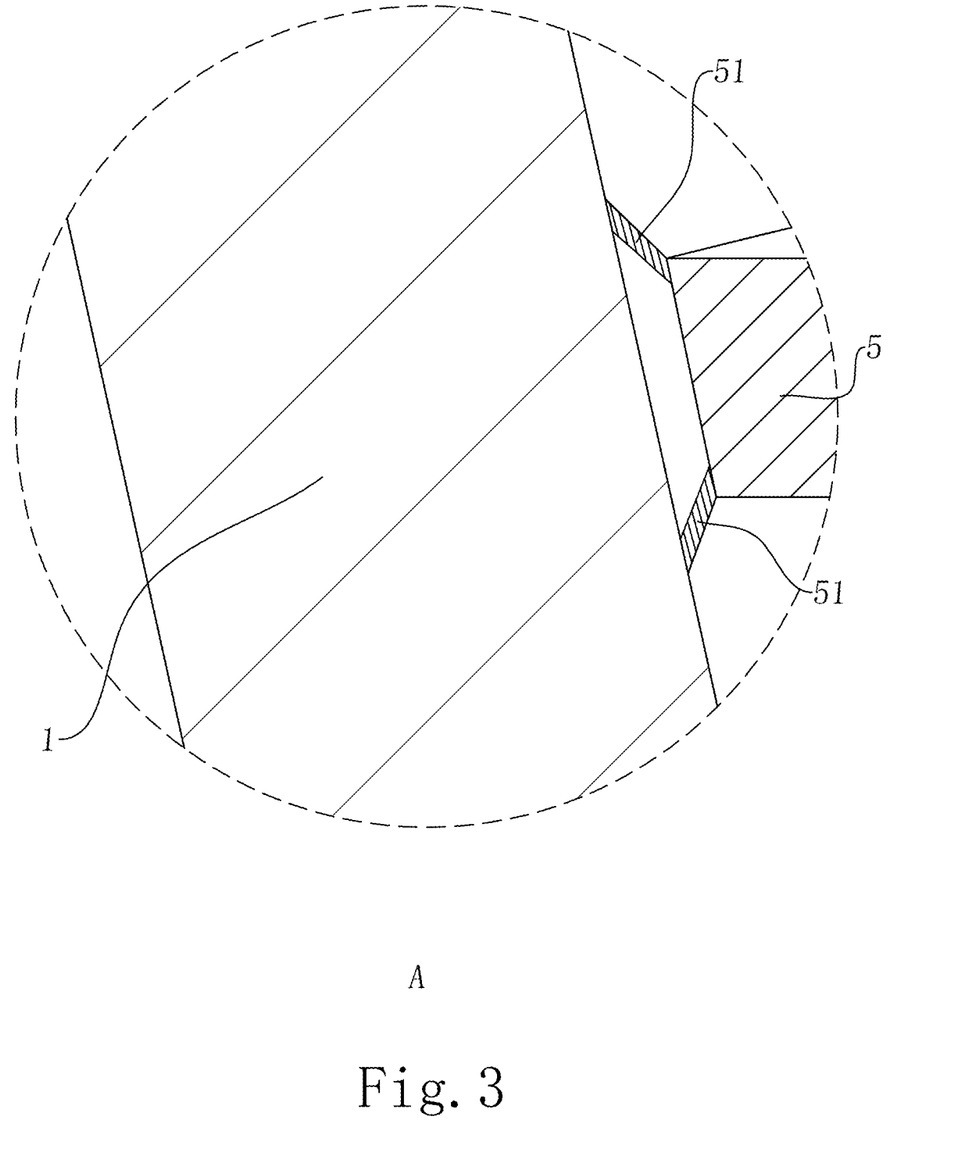
FIG. 3 is a partial enlarged view of A in FIG. 2.

As shown in FIG. 2 and FIG. 3, an outer peripheral surface of the lower conical section 21 is fixedly sleeved with a first spiral blade 5, rubber shoveling edges 51 are fixed on an outer edge of the first spiral blade 5 by means of adhesion or rivet connection, the rubber shoveling edges 51 are spirally arranged along an outer diameter of the first spiral blade 5, and the rubber shoveling edges 51 elastically and obliquely abut on an inner peripheral wall of the barrel 1, such that a surface of the first spiral blade 5, the inner peripheral wall of the barrel 1, and an outer peripheral surface of the central tube 2 define a spiral channel to limit a motion path of the water-containing airflow, thereby extending the motion path.

Figure 4:
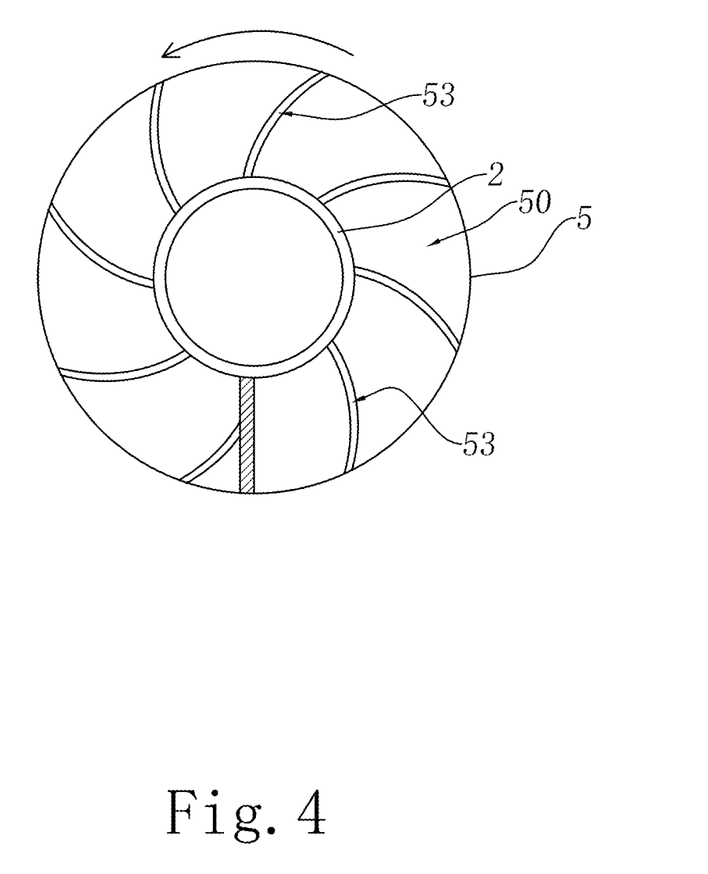
FIG. 4 is a bottom view of a first spiral blade according to Embodiment 2.

As shown in FIG. 2 and FIG. 4, a lower surface of the first spiral blade 5 is set as a concave-convex surface 50 which may be forged or cast, that is, a plurality of pits are densely distributed on the lower surface of the first spiral blade 5. In other embodiments, the lower surface of the first spiral blade 5 may be a high-roughness surface or a brushed surface.

The concave-convex surface 50 is provided with a plurality of arc-shaped flow guide grooves 53 uniformly arranged around an axis of the first spiral blade 5 and having an arc direction facing the rotation direction of the central tube 2, and one end of each flow guide groove 53 communicates to an outer peripheral surface of the first spiral blade 5.

The implementation principle of Embodiment 2 is as follows: when the fan 4 generates a suction force, the water-containing airflow entering from the water inlet tube 11 moves in a spirally downward state along the spiral channel. During the process, under the action of a centrifugal force, water droplets are thrown towards an inner wall of the barrel 1. Because the rubber shoveling edges 51 are attached to the inner wall of the barrel 1, the rubber shoveling edges 51, when moving relative to the barrel 1, scrape away the attached soft water on the inner wall of the barrel 1, and the rubber shoveling edges 51 are spiral. As a result, the rubber shoveling edges 51, when moving, scrape away the soft water downwards, thus making it convenient for the soft water to be discharged downwards. The soft water enters the collecting sink 40 through the water-permeable holes 12.

The water-containing airflow located at a lower part of the barrel 1 moves up along the central tube 2 to the fan 4. The provision of the lower conical section 21 can accelerate the diffusion of the water-containing airflow just entering the central tube 2. Then, the airflow is discharged to the position, where the next treatment process is performed, by the fan 4, thus implementing steam-water separation.

First, through the rotation of the first spiral blade 5, the lower surface of the first spiral blade 5 applies a downward pressure to the water-containing airflow, that is, kinetic energy of the water-containing airflow is increased, such that the efficiency of steam-water separation is improved; moreover, the centrifugal force on the soft water is increased to increase the quantity of the water droplets thrown out, thereby improving the effect of steam-water separation.

Secondly, when the first spiral blade 5 applies the pressure to the water-containing airflow, part of the soft water in the water-containing airflow is adsorbed by the concave-convex surface 50, and a tension of water is used to efficiently adsorb the soft water, thus enhancing the effect of steam-water separation. Moreover, under a rotational force of the first spiral blade 5, the soft water on the concave-convex surface 50 is subjected to the centrifugal force and slowly moves outward, the soft water easily falls into the arc-shaped flow guide grooves 53 and then is quickly discharged along the flow guide grooves 53 to the inner wall of the barrel 1, and downstream collection of the soft water is accelerated under the scraping effect of the rubber shoveling edges 51, thereby reducing the situation that the soft water on the concave-convex surface 50 is not liable to flow.

In this way, the quantity of the soft water obtained by the steam-water separator 30 can be greatly increased, so as to improve the recycling effect of the soft water and reduce the waste of the soft water.

Embodiment 3

Figure 5:
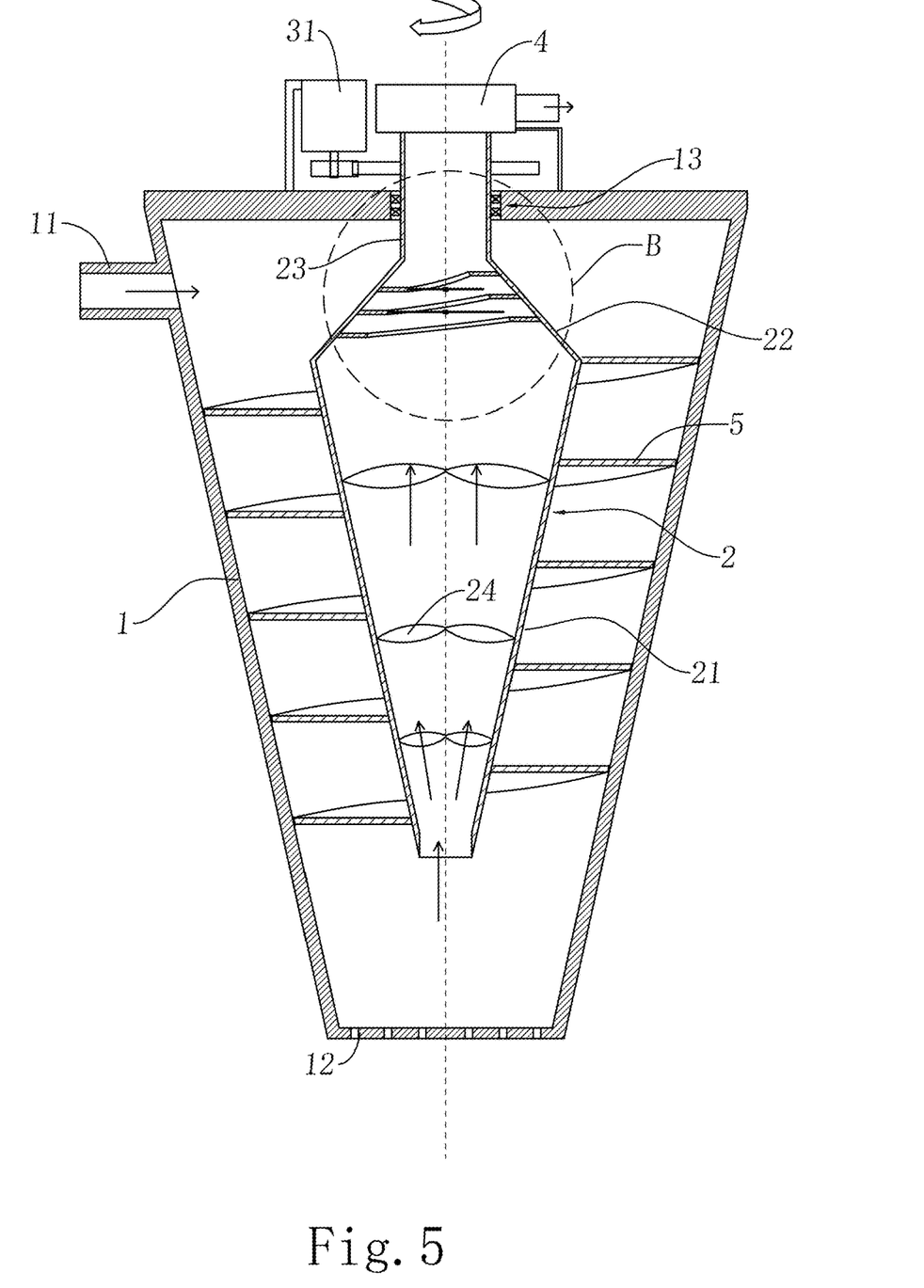
FIG. 5 is a sectional view of a steam-water separator according to Embodiment 3.
Figure 6:
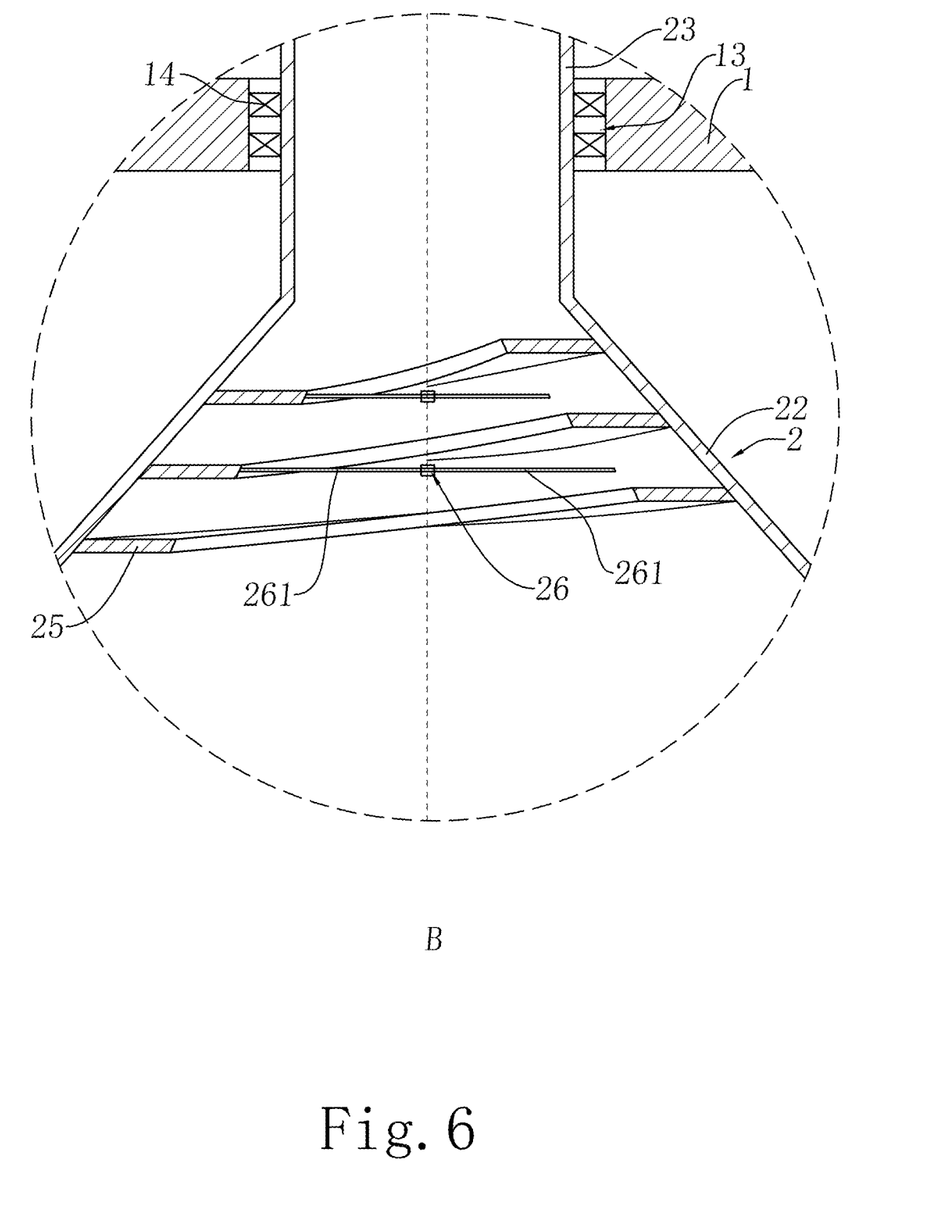
FIG. 6 is a partial enlarged view of B in FIG. 5.

The difference between Embodiment 3 and Embodiment 2 is that as shown in FIG. 5 and FIG. 6, a plurality of propeller type suction paddles 24 are arranged in the lower conical section 21. Specifically, outer diameter parts of the suction paddles 24 are welded and fixedly connected to an inner wall of the lower conical section 21, the suction paddles 24 are arranged at intervals along an axial direction of the lower conical section 21, and sizes of the suction paddles 24 gradually increase from bottom to top.

A second spiral blade 25 is coaxially arranged in the upper conical section 22. Specifically, an outer edge of the second spiral blade 25 is welded and fixedly connected to an inner peripheral wall of the upper conical section 22. The second spiral blade 25 is arranged in the same spiral direction as the first spiral blade 5. A plurality of flow guide paddles 26 are arranged at a hollow part of the second spiral blade 25. Specifically, each flow guide paddle 26 is composed of a plurality of horizontal blades 261 uniformly arranged on a circumference. One ends of the horizontal blades 261 are fixed together. One end of one horizontal blade 261 of the flow guide paddle 26 is welded and fixedly connected to an inner peripheral wall of the second spiral blade 25.

With the rotation of the central tube 2, an action force of the suction paddles 24 drives the water-containing airflow to ascend, and the diffusion of the water-containing airflow just entering the central tube 2 is greatly accelerated in combination with the accelerated diffusion of the lower conical section 21, so as to improve the separation efficiency of the water-containing airflow.

When the water-containing airflow moves up into the upper conical section 22, the flow guide paddles 26 and the second spiral blade 25 can prevent rapid passage of the water-containing airflow. By means of blockage, the soft water is attached to surfaces of the flow guide paddles 26 and the second spiral blade 25 and then is thrown out by the centrifugal force to the inner wall of the central tube 2, so as to implement secondary separation of the water-containing airflow.

Figure 7:
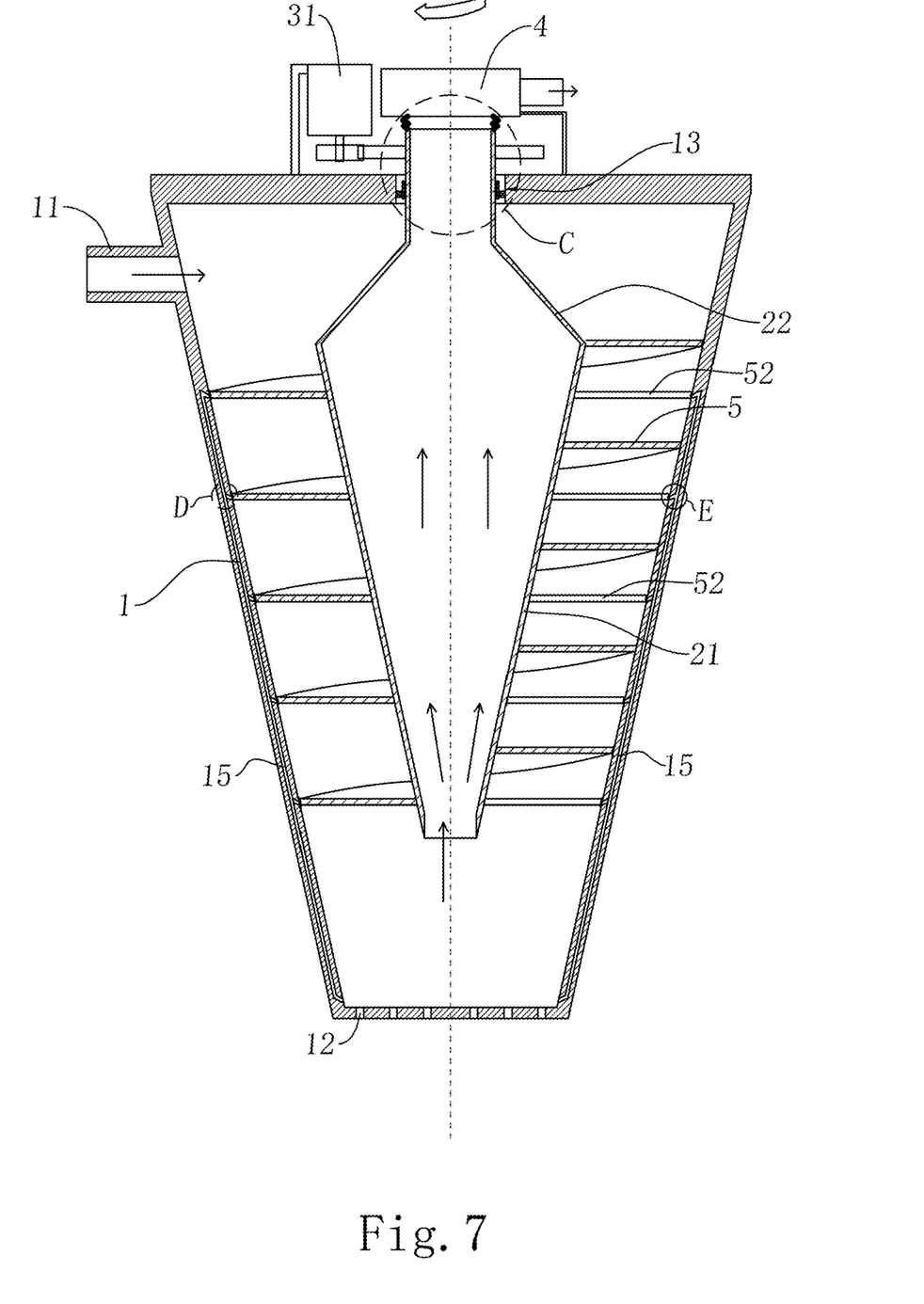
FIG. 7 is a sectional view of a steam-water separator according to Embodiment 4.
Figure 8:
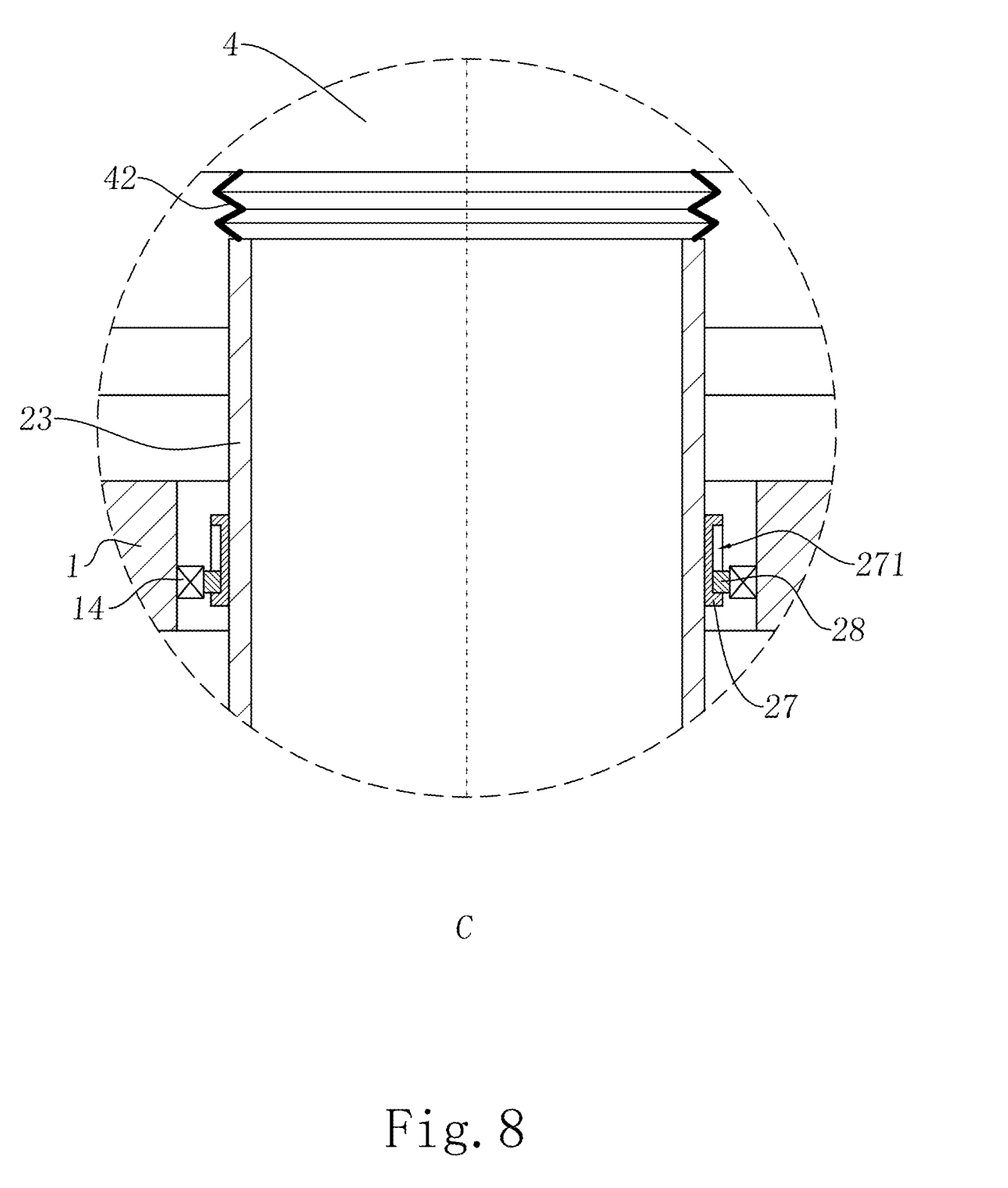
FIG. 8 is a partial enlarged view of C in FIG. 7.

The difference between Embodiment 4 and Embodiment 2 is that as shown in FIG. 7 and FIG. 8, the outer peripheral wall of the equal-width section 23 is fixedly sleeved with a rubber ring 27, a ring groove 271 is provided on an outer peripheral wall of the rubber ring 27, and a slip ring 28 vertically slides in the ring groove 271. The slip ring 28 fits with the inner wall of the through hole 13 by the bearing 14, such that the central tube 2 is rotatable relative to the barrel 1 and can vertically move a short distance.

Correspondingly, an upper end of the equal-width section 23 is connected to the air inlet end of the fan 4 by a corrugated tube 42. The corrugated tube 42 has scalability, thereby reducing the situation of interference with the fan 4 due to the up-down movement of the central tube 2. Additionally, a lower end opening of the corrugated tube 42 is rotatably and hermetically connected to the upper end opening of the equal-width section 23.

Figure 9:
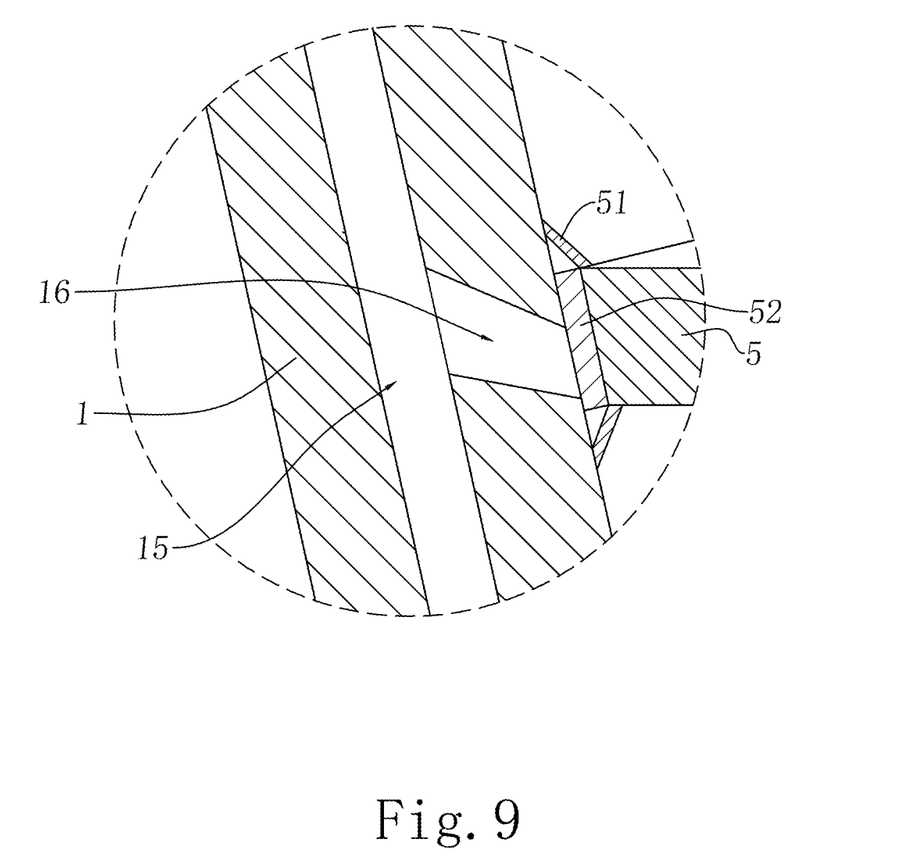
FIG. 9 is a partial enlarged view of D in FIG. 7.
Figure 10:
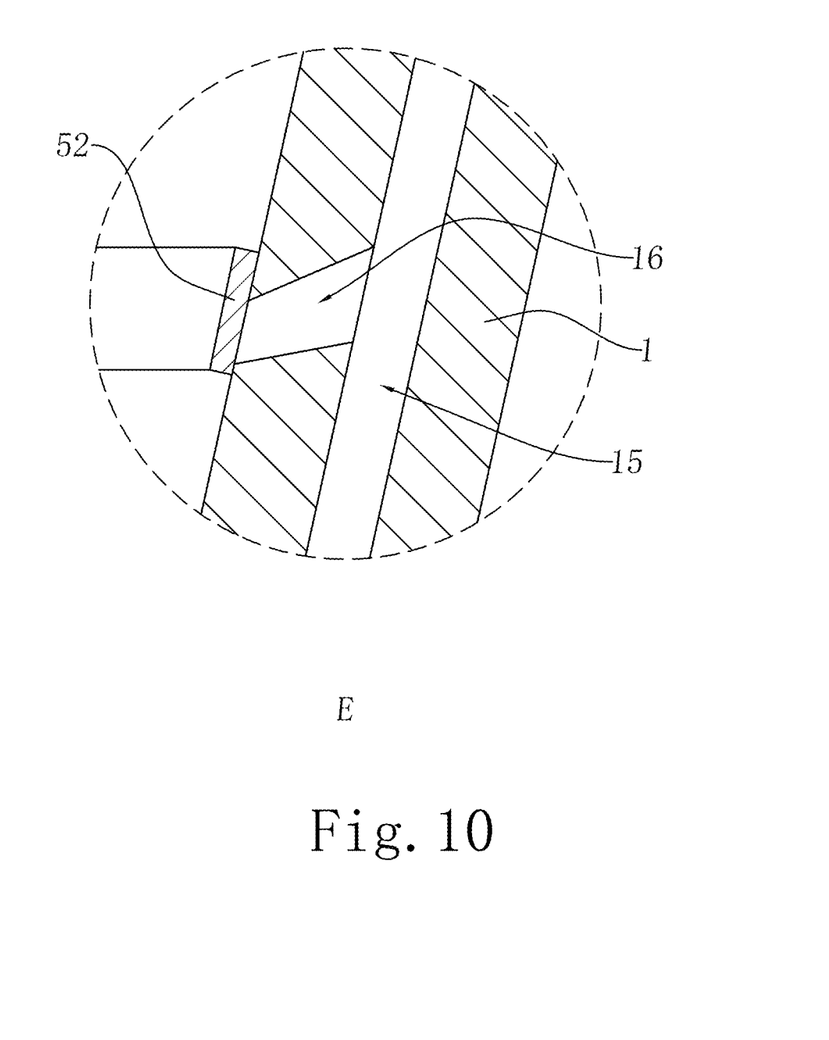
FIG. 10 is a partial enlarged view of E in FIG. 7.

As shown in FIG. 7, FIG. 9, and FIG. 10, a flow channel 15 extending along a main line of the barrel 1 is provided inside the barrel 1, and a lower end of the flow channel 15 communicates with the lower end opening of the barrel 1. A plurality of annular water passing gaps 16 are provided on the inner peripheral wall of the barrel 1. The water passing gaps 16 are arranged at intervals along an axis of the barrel 1. An opening direction of the water passing gaps 16 is inclined downwards. The water passing gaps 16 communicate with the flow channel 15.

Shielding rings 52 are fixed on an outer side of the first spiral blade 5 and may be made of rubber. The shielding rings 52 are coaxial with the barrel 1, that is, only part of an inner diameter position of each shielding ring 52 is fixed to the outer peripheral surface of the first spiral blade 5 by means of adhesion or rivets. The rubber shoveling edges 51 do not have gaps (not shown in the figures) to avoid the shielding rings 52. The shielding rings 52 are in one-to-one correspondence with the water passing gaps 16.

The steam-water separation is carried out in two steps. The first step is the steam-water separation. The motor 31 drives the central tube 2 to rotate at a low speed. Therefore, under the action of gravity, the central tube 2 is in a low position. At this time, the rubber shoveling edges 51 on the first spiral blade 5 are in a state where they are attached to the inner peripheral wall of the barrel 1, and the shielding rings 52 are in a state where the water passing gaps 16 are completely shielded, such that the spiral channel is closed as much as possible to reduce the leakage of the water-containing airflow, thereby ensuring the effect of pressurization.

After a certain volume of the soft water accumulates on the inner wall of the barrel 1, the second step is performed. In order to accelerate discharge of the water, the speed of the motor 31 is increased to increase the rotational speed of the first spiral blade 5. At this time, a reaction force of the water-containing airflow on the first spiral blade 5 increases. This reaction force is applied to the lower surface of the first spiral blade 5 to support the first spiral blade 5 by overcoming the action of gravity, such that the first spiral blade 5 moves up a short distance. The shielding rings 52 move up to be away from the water passing gaps 16. Meanwhile, water passing gaps are further formed between the rubber shoveling edges 51 and the inner peripheral wall of the barrel 1.

When there are the water passing gaps, the first spiral blade 5 rotates to disturb the water-containing airflow, such that a pressure difference is caused, that is, a pressure below the water passing gaps is greater than a pressure above the water passing gaps. Under the pressure difference, the soft water attached to the barrel 1 and located near the water passing gaps moves up a short distance. The soft water enters the flow channel 15 through the water passing gaps 16 and then can quickly flow down to be discharged under the action of gravity, such that the soft water on the inner wall of the barrel 1 is quickly discharged and is not easily carried away again by the airflow.

The above are all preferred embodiments of the present application and do not limit the scope of protection of the present application. Therefore, any equivalent changes made based on the structure, shape and principle of the present application should be included within the scope of protection of the present application.

What is claimed is:

1. A sealing soft water recovery apparatus for a vacuum pump in a vacuum pressure swing adsorption oxygen generation system, comprising a water tank, a wet Roots vacuum pump, a steam-water separator, and a collecting sink which are sequentially connected, wherein the collecting sink is connected to the water tank by a delivery tube provided with a delivery pump; the water tank is connected to the wet Roots vacuum pump by a water inlet tube provided with a solenoid valve for controlling the opening and closing of a water channel;

the steam-water separator comprises a conical barrel, a central tube, a fan, and a driving assembly, wherein an air inlet tube communicating with an outlet of the wet Roots vacuum pump is arranged at an upper part of the barrel, and a lower end opening of the barrel is connected to the collecting sink; the central tube is coaxial with the barrel, an upper end of the central tube extends out of the barrel and is connected to an air inlet end of the fan, an outer peripheral wall of the central tube is fixedly sleeved with a first spiral blade, rubber shoveling edges are provided on an outer edge of the first spiral blade and attached to an inner peripheral wall of the barrel, and a surface of the first spiral blade, the inner peripheral wall of the barrel, and an outer peripheral surface of the central tube define a spiral channel; the driving assembly is configured to drive the central tube to rotate about an axis of the barrel, and when the central tube drives the first spiral blade to rotate, a lower surface of the first spiral blade applies a downward pressure to a water-containing airflow;

the central tube sequentially comprises an equal-width section, an upper conical section, and a lower conical section from top to bottom, wherein a length of the lower conical section is greater than a length of the upper conical section, a large end opening of the lower conical section is connected to a large end opening of the upper conical section, a lower end opening of the equal-width section is connected to a small end opening of the upper conical section, and an upper end opening of the equal-width section is rotatably connected to the air inlet end of the fan; the lower surface of the first spiral blade is set as a concave-convex surface provided with a plurality of arc-shaped flow guide grooves uniformly arranged around an axis of the first spiral blade, and one end of each of the flow guide grooves communicates to an outer peripheral surface of the first spiral blade; the upper end of the central tube is connected to the air inlet end of the fan by a corrugated tube, a through hole for the central tube to pass through is provided on an upper end surface of the barrel, the central tube is fixedly sleeved with a rubber ring, a ring groove is provided on an outer peripheral wall of the rubber ring, a slip ring vertically slides in the ring groove, a bearing is arranged between the slip ring and an inner wall of the through hole, and when the central tube moves up, there are water passing gaps between the rubber shoveling edges and the inner peripheral wall of the barrel; a flow channel extending along a main line of the barrel is provided inside the barrel, annular water passing gaps are provided on the inner peripheral wall of the barrel and communicate with the flow channel, the flow channel communicates with the lower end opening of the barrel, and the water passing gaps are inclined downwards; shielding rings coaxial with the barrel are fixed on an outer side of the first spiral blade; and when the central tube moves down, the shielding rings move down to shield the water passing gaps, and when the central tube moves up, the shielding rings move up to move away from the water passing gaps.

2. The sealing soft water recovery apparatus for a vacuum pump in a vacuum pressure swing adsorption oxygen generation system according to claim 1, wherein the water inlet tube is provided with a first manual switching valve located at an inlet end of the solenoid valve and a second manual switching valve located at an outlet end of the solenoid valve; and the water inlet tube is further provided with a bypass hose in parallel, and the bypass hose is provided with a third manual switching valve.

3. The sealing soft water recovery apparatus for a vacuum pump in a vacuum pressure swing adsorption oxygen generation system according to claim 1, wherein the water inlet tube is provided with a flow meter and a flow control hand valve both located between the water tank and the solenoid valve.

4. The sealing soft water recovery apparatus for a vacuum pump in a vacuum pressure swing adsorption oxygen generation system according to claim 1, wherein a liquid level switch is arranged in the collecting sink and electrically connected to the delivery pump.

5. The sealing soft water recovery apparatus for a vacuum pump in a vacuum pressure swing adsorption oxygen generation system according to claim 1, wherein a plurality of vertically spaced suction paddles are fixed in the lower conical section, and when the central tube rotates, an action force of the suction paddles drives the water-containing airflow to ascend; and a second spiral blade is coaxially arranged in the upper conical section, an outer edge of the second spiral blade is fixedly connected to an inner peripheral wall of the upper conical section, and flow guide paddles located at an axis of the upper conical section are fixed on an inner peripheral wall of the second spiral blade.

* * * * *